United States Patent [19]
Guerin

[11] Patent Number: 5,532,859
[45] Date of Patent: Jul. 2, 1996

[54] ELECTRO-OPTICAL DEVICE FOR VARIABLE SCAN WIDTH

[75] Inventor: Jean-Michel Guerin, Glendale, Calif.

[73] Assignee: Xerox Corporation, Stamford, Conn.

[21] Appl. No.: 179,180

[22] Filed: Jan. 10, 1994

[51] Int. Cl.$^6$ ............................................. G02F 1/03
[52] U.S. Cl. ............................................. 359/249; 359/304
[58] Field of Search ........................ 359/216, 256, 359/258, 298, 301, 303, 249, 278, 304

[56] References Cited

U.S. PATENT DOCUMENTS

| | | | |
|---|---|---|---|
| 5,251,057 | 10/1993 | Guerin et al. | 359/249 |
| 5,251,058 | 10/1993 | MacArthur | 359/249 |

Primary Examiner—Georgia Y. Epps
Assistant Examiner—Dawn-Marie Bey
Attorney, Agent, or Firm—Fariba Rad

[57] ABSTRACT

A raster output scanning system is disclosed which utilizes a single light source, an electro-optical device and a beam-splitter to generate two partially overlapping light beams in order to scan one scan line in which the width of the scan line can be adjusted electronically. The two partially overlapping light beams in effect generate a resulting light beam. By changing the polarization factor of the electro-optical device, the intensities of the two light beams can be modified which in turn will change the width of the resulting light beam and as a result the spot size changes. By changing the spot size, the width of the scan line can be adjusted. Also, by changing the polarization factor, the position of the resulting light beam can be changed.

6 Claims, 6 Drawing Sheets

ELECTRO-OPTICAL DEVICE FOR VARIABLE SCAN WIDTH

This invention relates to a raster output scanning system and more particularly, to a raster scanning system which utilizes a single light source, an electro-optical device and a beam-splitter to generate two partially overlapping light beams in order to scan one scan line in which the width of the scan line can be adjusted electronically.

BRIEF DESCRIPTION OF THE DRAWING

Other objects will become apparent from the following description with reference to the drawings wherein.

DESCRIPTION OF THE PREFERRED EMBODIMENT

Figure 1:
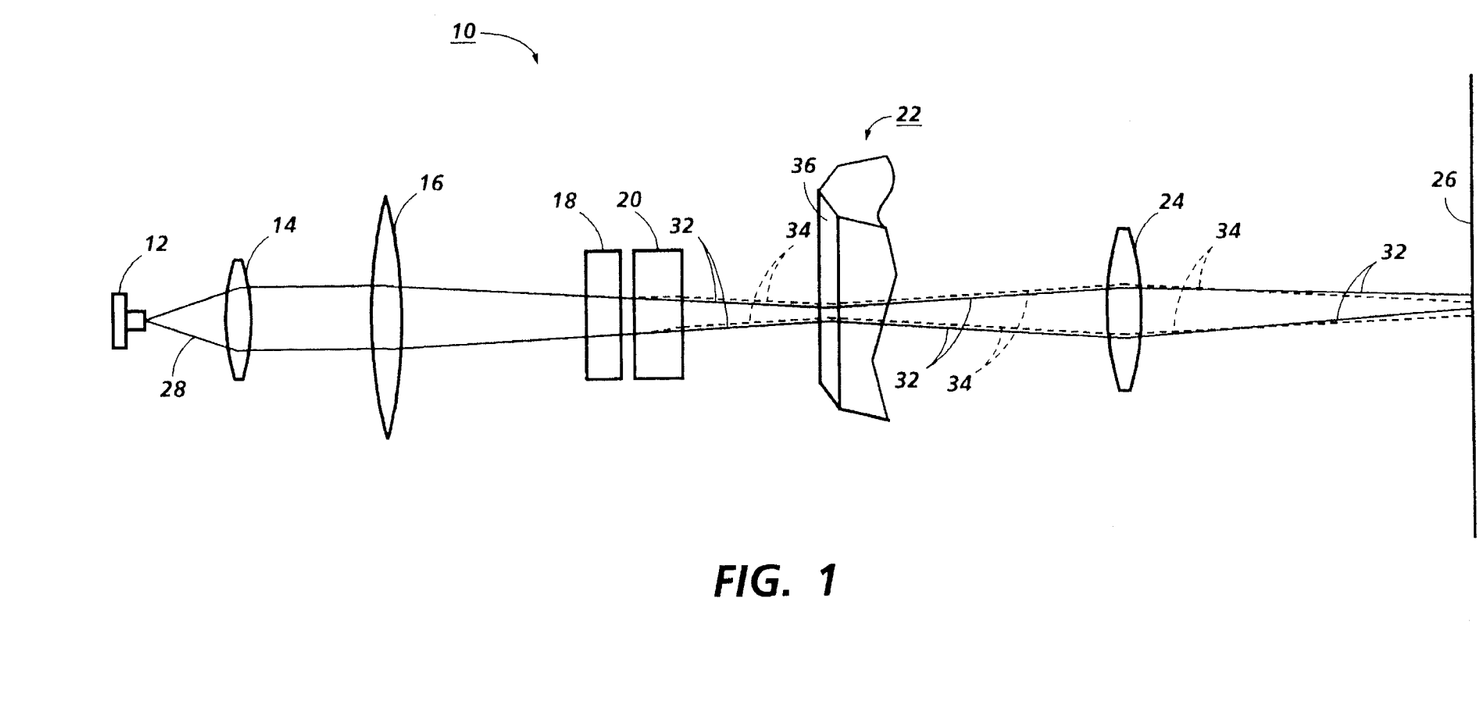
FIG. 1 shows a raster scanner of this invention.

Referring to FIG. 1, there is shown a raster scanner 10 of this invention. The raster scanner 10 contains a laser light source 12, a collimator 14, pre-polygon optics 16, an electro-optical device 18, a beam-splitter 20, rotating polygon mirror 22, post polygon optics 24 and a photosensitive medium 26. The light source 12, produces a light beam 28 and sends it to the electro-optical device 18 through the collimator 14 and the pre-polygon optics 16.

Figure 2:
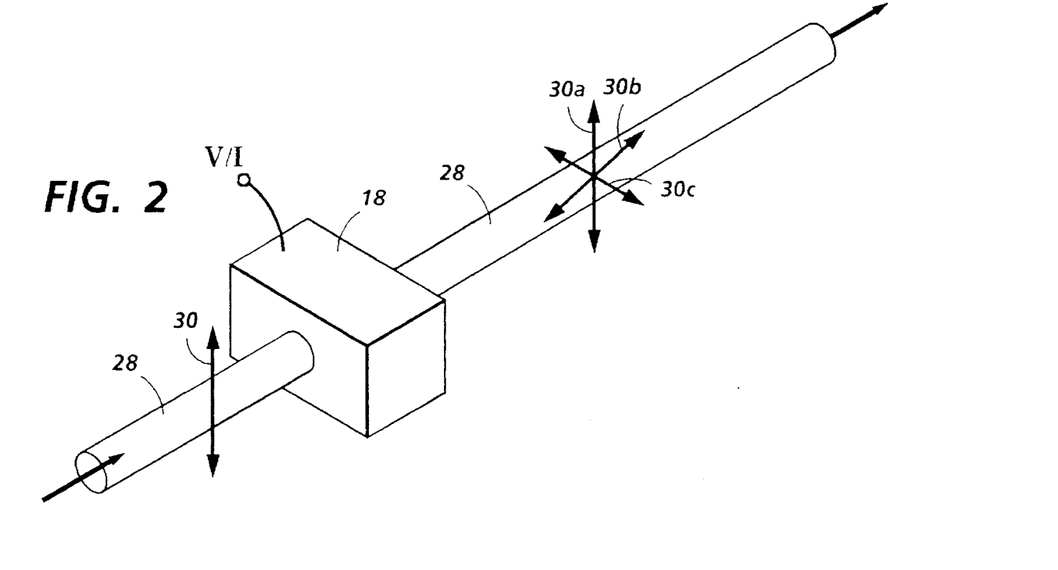
FIG. 2 shows an electro-optical device utilized in this invention for continuously rotating the polarization of the light beam passing through the electro-optical device.

For slow applications (milisecond-type), the electro-optical device 18 can be a liquid crystal cell and for faster applications (sub-micro second) it can be an electro-optical Kerr-type cell or a magneto-optic cell. Referring to FIG. 2, upon applying a control voltage V or a control current I, the electro-optical device 18 continuously rotates the polarization of the light beam passing through the electro-optical device 18. For example, the arrow 30 shows the polarization of the light beam before it enters the electro-optical device 18 and the arrows $30_a$, $30_b$ and $30_c$ show the polarization of the light beam after it exits the electro-optical device 18 based on three different control voltages. Depending on the control voltage, the light beam 28 exiting the electro-optical device 18 will have only one polarization.

Figure 3:
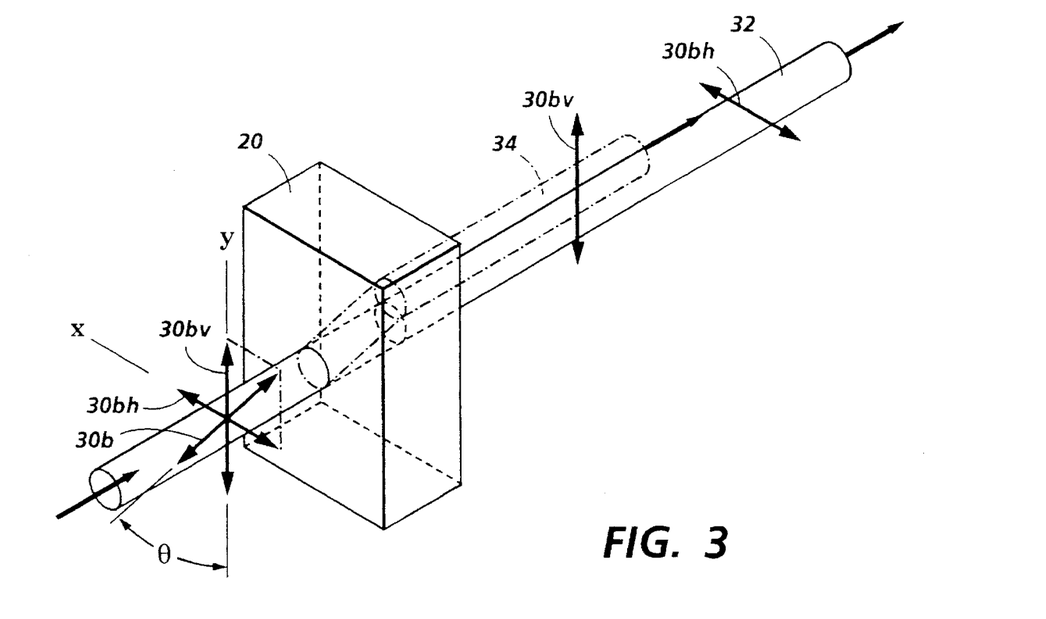
FIG. 3 shows a beam-splitter utilized in this invention to split the vertical and horizontal components of a polarized light beam.

Referring to FIG. 3, the light beam 28 from the electro-optical device 18 (FIG. 2) is sent to the beam-splitter 20. The beam-splitter 20 can be any type of birefringent crystal such as calcite, $TeO_2$, $LiNbO_3$, or a similar crystal. If the polarization $30_b$ of the light beam exiting the electro-optical device 18 has an angle θ ▊ with the Y axis of crystal, then the polarization can be imaged on two axes Y and X (X axis being perpendicular to Y axis). The polarized component $30_{bv}$ is along the Y axis of the crystal and the polarized component $30_{bh}$ is along the X axis of the crystal. In the above crystals, a polarized component perpendicular to the crystal axis will pass through. However, the other component will be deflected in an angle inside the crystal and while exiting the crystal it will be deflected in such a manner that it exits parallel to the first component.

Referring back to FIG. 1, the two beams 32 and 34 will be sent to the rotating polygon mirror 22. The rotating polygon has a plurality of facets 36, each of which is a plane mirror. The facets 36 of the rotating polygon mirror 22 reflect the light beams 32 and 34 and also cause the reflected light beams 32 and 34 to revolve about an axis near the center of reflection of the rotating polygon mirror 22 scanning a line. These reflected light beams 32 and 34 can be utilized to scan a document at the input end of an imaging system as a raster input scanner or can be used to impinge upon a photographic film or a photosensitive medium 22, such as a xerographic drum at the output of the imaging system. The two light beams 32 and 34 partially overlap each other and as a result generate one single light beam on a photoreceptor plane 22 to scan one scan line. Therefore the two light beams will have the effect of one light beam.

By adjusting the voltage applied to the electro-optical device 18 (FIG. 1) the amount of polarization of the light beam can be changed and as a result the amount of the intensities of the two light beams exiting the beam-splitter 20 (FIG. 1) will also change. Also, depending on the thickness of the crystal used as the beam-splitter 20, the overlap between the two light beams can be changed By selecting a proper crystal, the overlap between the two light beams can be kept equal to Full Width Half Max/2 (FWHM/2) or a factor of FWHM of a single light beam. Full width half max (hereinafter referred to as "FWHM") is the width of the Gaussian distribution at half of the maximum intensity.

In order to comprehend this invention, it is necessary to study the combination of two light beams and the effects of the polarization change on each light beam and on their resulting light beam through their Gaussian distributions.

Figure 4:
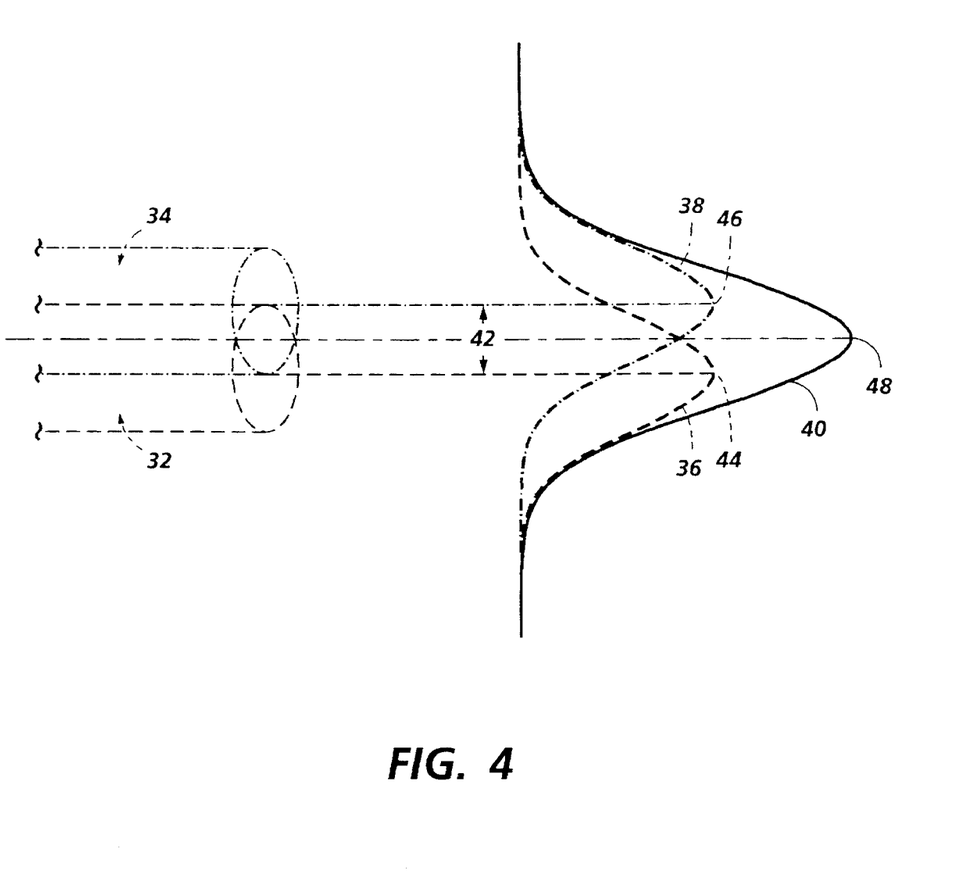
FIG. 4 shows Gaussian distributions of two light beams which partially overlap each other and also the Gaussian distribution of their resulting light beam.

Referring to FIG. 4, there are shown Gaussian distributions 36 and 38 of the two light beams 32 and 34 which partially overlap each other. When the two light beams overlap, in effect they become one light beam which hereinafter it will be called "resulting light beam".

FIG. 4 also shows the Gaussian distribution 40 of the resulting light beam. If the two light beams 32 and 34 partially overlap each other in such a manner that the distance 42 between the peak 44 of the Gaussian distribution 36 and the peak 46 of the Gaussian distribution 38 is kept in a range between 0 to 0.7 FWHM of a single light beam at its maximum intensity, then the resulting light beam will substantially have a Gaussian distribution. However, for the purpose of this invention which uses two partially overlapping light beams to change the width of a scan line, the overlap between the two light beams should be kept in the range of 0.3 FWHM to 0.7 FWHM.

By changing the polarization through the electro-optical device 18 (FIG. 1), the intensities of the two light beams exiting the beam-splitter 20 (FIG. 1) will change. By changing the intensities of the two light beams, the Gaussian distribution 40 of the resulting light beam will also change.

Figure 5:
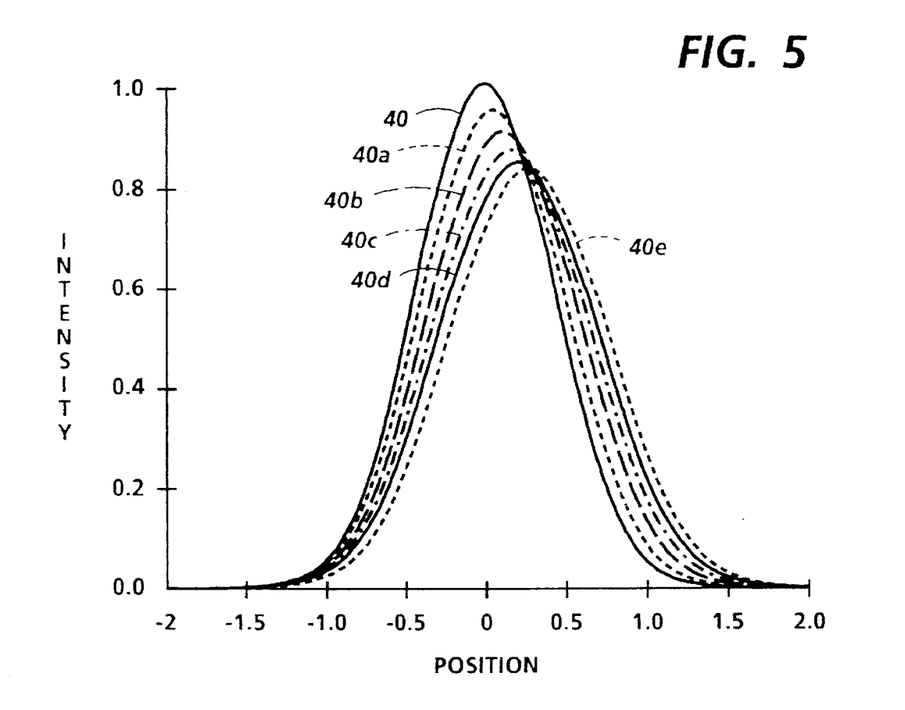
FIG. 5 shows the changes of a Gaussian distribution of resulting light beam as a function of the variation of the two intensities of the two light beams with FWHM/2 (0.5 FWHM) overlap.

Referring to FIG. 5, there are shown the changes of a Gaussian distribution of a resulting light beam as a function of the variation of the two intensities of the two light beams with FWHM/2 (0.5 FWHM) overlap. The horizontal axis represents position and the vertical axis represents the intensity. Gaussian distribution 40 is the Gaussian distribution of the light beam with horizontal polarization which passes through the beam-splitter without splitting into two light beams.

As the polarization of the light beam changes, the light exiting the beams-splitter starts splitting into two light beams. By changing the polarization, the intensities of the two light beams exiting the beam-splitter change. Also, by changing the polarization of the light beam, the intensity of one light beam decreases and the intensity of the other light beam increases. Since one light beam from the light source is being split into two light beams, the sum of the intensities of the two light beams is always equal to the intensity of the light beam 28 (FIG. 1) from the light source. As the intensities of the two light beams change, the Gaussian distribution of the resulting light beam changes.

The Gaussian distributions 40a, 40b, 40c and 40d show the gradual change of the resulting light beam as the intensity of one light beam decreases and the intensity of the other light beam increases. The Gaussian distribution 40e shows the distribution of the resulting light beam when the intensities of the two light beam are equal. As it can be observed, by changing the intensities of the two light beams, the FWHM of the Gaussian distribution of the resulting light beam becomes wider. As a result, the FWHM, which hereinafter will be referred to as the "beam width", increases.

Figure 6:
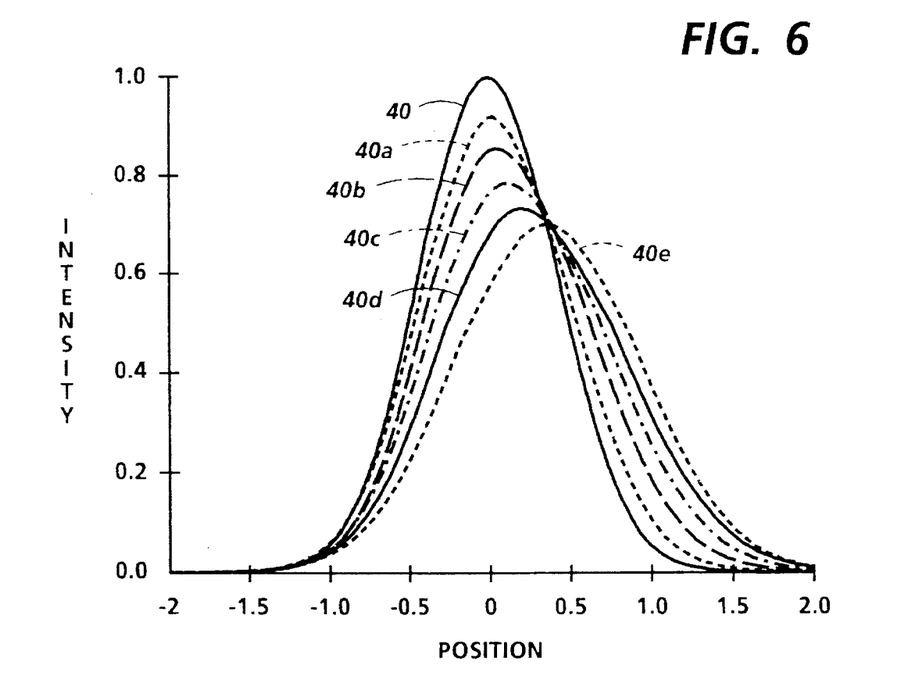
FIG. 6 shows the changes of a Gaussian distribution of resulting light beam as a function of the variation of the two intensities of the two light beams with 0.7 FWHM overlap.

It should be noted that FIGS. 5 and 6 show the variation of the resulting light beam for the combination of the two light beams when one light beam is On with an intensity change in the range of 100% to 50% and the other beam is simultaneously On with an intensity change in the range of 0% to 50%.

However, by changing the amount of the overlap, the growth of the Gaussian distribution of the resulting light beam can be increased. Referring to FIG. 6, there is shown a graph of a Gaussian distribution of a resulting light beam as the intensities of the two light beams change. In FIG. 6, the overlap between the two light beams is equal to 0.7 FWHM. It can be observed that as the intensity of one light beam decreases and the intensity of the other light beam increases the Gaussian distributions 40a, 40b, 40c, 40d and 40e become wider than the Gaussian distributions shown in FIG. 5 which belong to two light beams with 0.5 FWHM overlap.

Figure 7:
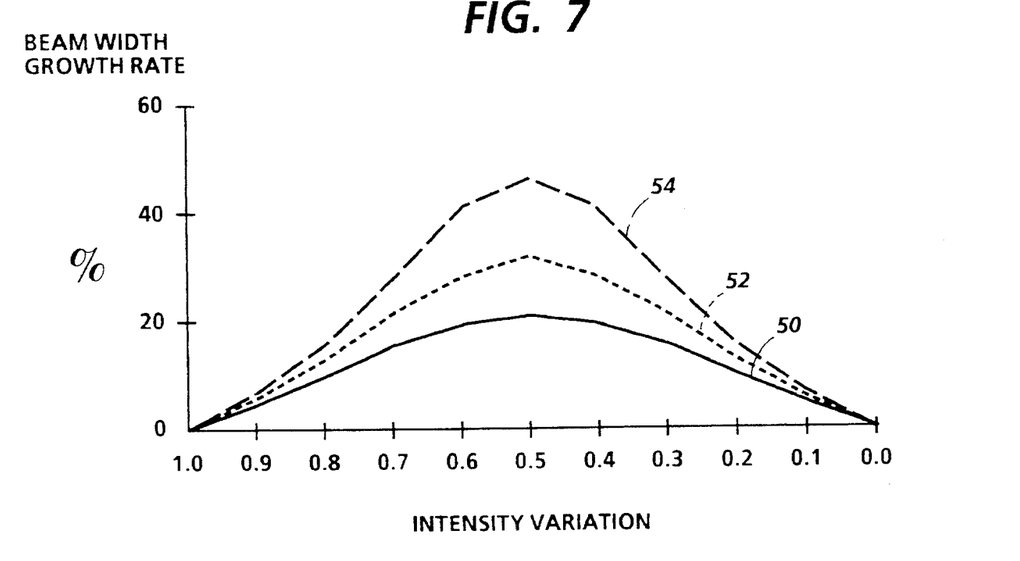
FIG. 7 shows the graphs of the growth rate of the width of the resulting light beam as a function of the amount of overlap.

Referring to FIG. 7, there are shown graphs of the growth rate of the resulting light beam as a function of the amount of overlap. The horizontal axis represents the intensity variation for one beam and vertical axis represents the percentage of the resulting beam width growth. On the intensity variation axis, the numbers represent the intensity changes of one light beam. Hereinafter, the light beam 32 (FIG. 3) generated by the horizontal component will be called "first light beam" and the light beam 34 (FIG. 3) generated by the vertical component will be called "second light beam".

At the origin, the polarization is a horizontal polarization and since there is no vertical component, the light beam from the electro-optical device will pass through the beam-splitter without splitting. Therefore, the intensity of the first light beam is equal to the intensity of the light beam from the light source which is shown by 1 at the origin. As the polarization changes, the intensity of the second light beam increases and the intensity of the first light beam decreases. When the polarization becomes a vertical polarization, then there is no horizontal component and therefore the light beam from the electro-optical device will completely be deflected to the second light beam. In this case, the second light beam will have an intensity equal to the intensity of the light beam from the light source. Therefore, where the intensity for the second light beam is 1, the intensity for the first light beam is 0 which means that the first light beam does not exist.

In FIG. 7, curves 50, 52 and 54 represent the beam width growth of the resulting light beam for two light beams which have an overlap equal to 0.5 FWHM, 0.6 FWHM and 0.7 FWHM respectively. As it can be observed, the growth rate for the two light beams which have an overlap equal to 0.7 FWHM is more. However, it should be noted that there is a limit in increasing the overlap between two light beams. If the overlap between the two light beams is increased far more than 0.7 FWHM, then the resulting light beam will lose its Gaussian distribution. Therefore, the overlap should be kept at the neighborhood of FWHM/2 in order to have a resulting light beam with a Gaussian distribution.

The curves 50, 52 and 54 also, show that the growth rate of the width reaches its maximum when the intensities of the two light beams become equal. By changing the polarization of the electro-optical device to 45°, the horizontal component becomes equal to the vertical component and therefore, the intensities of the two light beams become equal. The concept of changing the width of the resulting light beam by modifying the polarization factor can be used to modify the spot size on the photoreceptor plane. Depending on the requirements of the scanning system, the birefringent crystal will be selected to provide a proper overlap between the two light beams. During the operation, by changing the polarization of the electro-optical device through the applied voltage, the width of the light beam and as a result, the size of the spot on the photoreceptor can be adjusted. By adjusting the spot size, the width of the scan line will also be adjusted.

Adjusting the spot size can be used for different applications. For example, a raster scanner with multiple resolutions can benefit from the spot size adjustment provided by this invention. A raster scanner, which is capable of printing 300 spi or 400 spi, can utilize the enclosed embodiment of this invention to adjust the spot size depending on if 300 spi or 400 spi option is selected.

Also, the disclosed embodiment of this invention can also be utilized to adjust the incorrect spot sizes due to various reasons such as aberration in the raster scanning system or tolerances of different elements in the raster scanning system.

In addition, the disclosed embodiment of this invention can be utilized in copy quality adjustments. Depending on the spot size, the discharge on the photoreceptor can vary. In order to measure the impact of the spot size on the photoreceptor discharge, the polarization of the electro-optical device of this invention can be modified to change the width of the light beam and as a result change the spot size.

Furthermore, the disclosed embodiment of this invention can be utilized for color experiments where there is a need to modify the spot size in order to measure the impact of the spot size on generating different colors.

Referring back to FIG. 4, if the intensities of the two light beams are kept equal, then the resulting light beam will have a peak 48 at the mid point between the two peaks 44 and 46 of the two light beams 32 and 34 respectively. However, if the intensities of the two light beams are changed, the peak 48 of the resulting light beam will be closer to the peak of the light beam with the higher intensity. The distance between the peak 48 of the resulting light beam and the peak of the light beam with the higher intensity depends on the difference between the two intensities of the two light beams.

Figure 8:
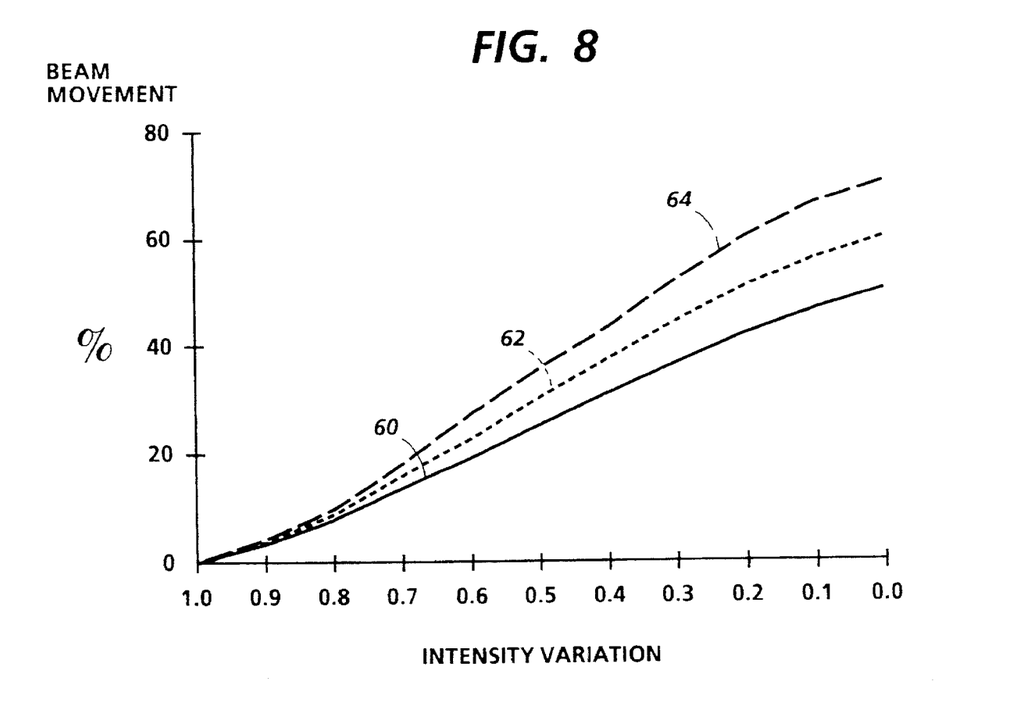
FIG. 8 shows the graphs of the movement of the resulting light beam as a function of the amount of overlap.

Referring to FIG. 8, there are shown graphs of the movement of a resulting light beam as a function of the amount of overlap. The horizontal axis represents the intensity variation for one beam and the vertical axis represents the movement of the resulting light beam. On the intensity variation axis, the numbers represent the intensity changes of one light beam.

Curves 60, 62 and 64 represent the movement of the resulting light beam for two light beams which have an overlap equal to 0.5 FWHM, 0.6 FWHM and 0.7 FWHM respectively. At the origin, the intensity is shown as 1.0 which means that the polarization is at 0° and therefore there is only one light beam (first light beam) at its maximum intensity. As the intensity decreases, it means that a second light beam is being combined with the original light beam. Also, as the polarization factor is changed the intensity of the first light beam is decreased and the intensity of the second light beam will be increased in order to keep the sum of the intensity of the two light beams equal to the maximum intensity (1.0). Therefore, since at the origin there is only one light beam, the movement is 0. However, as the second light beam is being combined with the first light beam, the resulting light beam moves. When the intensity of the first light beam is decreased to zero which means that the polarization is changed by 90°, then the intensity of the second light beam reaches its maximum (1.0). At this point, the resulting light beam will have its maximum movement. Again, it can be observed that the movement of the resulting light beam for the two light beams which have an overlap equal to 0.7 FWHM is more.

The capability of moving the resulting light beam by changing the polarization factor can be utilized for image enhancement. In a raster scanning system, the capability of moving the resulting light beam provides the hardware capability for moving the edges of characters of a document in the photoreceptor travel direction.

Figure 9:
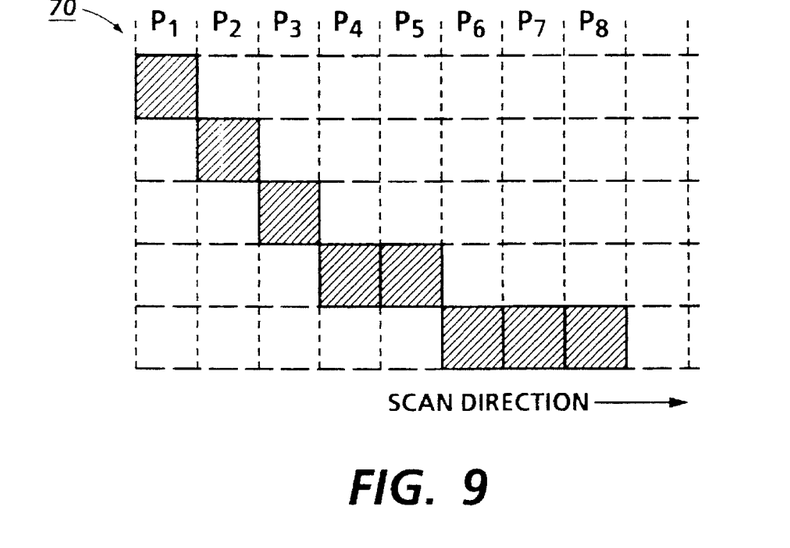
FIG. 9 shows a prior art document with a printed line which has jagged edges.
Figure 10:
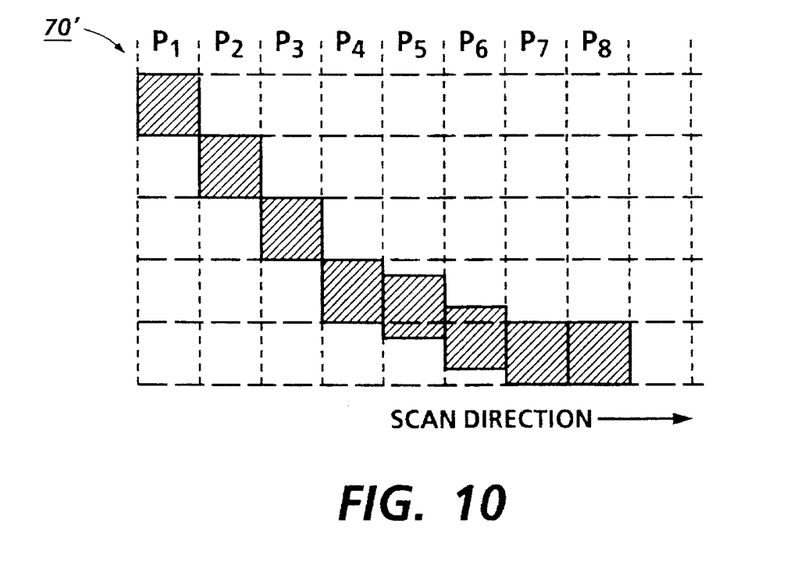
FIG. 10 shows the document of FIG. 9 printed by this invention which has a smooth line.

For example, referring to FIG. 9, there is shown a printed document with a line 70 (shown by pixels P1, P2, P3, P4, P5, P6 and P7) which has an angle with respect to the scan direction. As it can be observed, the line 70 has jagged edges and is not a smooth line. In order to smooth the jagged edges, the polarization of the light beam during pixels P5 and P6 can be adjusted in such a manner that the resulting beam will shift down for pixel P5 and will shift up for pixel P6. As a result, pixel P5 moves down and pixel P6 moves up which provides a smooth line 70' shown in FIG. 10. The movement of the resulting light beam is accompanied with the spot size change. However, for the image enhancement purpose, the spot size change is negligible.

What is claimed is:

1. A raster output scanner comprising:

a laser light source for emitting a light beam;

polarizing means located in the path of the light beam from said laser light source for receiving the light beam and polarizing the light beam;

a beam splitter located in the path of the polarized light beam from said polarizing means for receiving the polarized light beam;

said polarizing means and said beam splitter being so constructed and arranged relative to each other to generate one single light beam when the degree of polarization of the light beam is 0°, to generate another single light beam when the degree of polarization of the light beam is 90°, and splitting the polarized light beam into two partially overlapping light beams defining a single resulting light beam when the degree of polarization of the light beam is between 0° and 90°;

the intensity of the two partially overlapping light beams varying in accordance with the degree of polarization;

a medium;

a scanning means located in the path of the resulting light beam from said beam splitter and being so constructed and arranged to scan the resulting light beam onto said medium in order to scan one scan line;

means for controlling said polarizing means to change the degree of the polarization in order to change the intensity of the two partially overlapping light beams to change the width of the resulting light beam and thereby the width of the one scan line.

2. The raster output scanner recited in claim 1, wherein the overlap between the two partially overlapping light beams is in the range of 0.3–0.7 of the width of the Gaussian distribution of the light beam from said laser light source at half of its maximum intensity.

3. The raster output scanner recited in claim 1, wherein the smallest width occurs when the degree of polarization is at 0° or 90° and the largest width occurs when the degree of polarization is at 45°.

4. A raster output scanner comprising:

a laser light source for emitting a light beam;

polarizing means located in the path of the light beam from said laser light source for receiving the light beam and polarizing the light beam;

a beam splitter located in the path of the polarized light beam from said polarizing means for receiving the polarized light beam;

said polarizing means and said beam splitter being so constructed and arranged relative to each other to generate one single light beam when the degree of polarization of the light beam is 0°, to generate another single light beam when the degree of polarization of the light beam is 90°, and splitting the polarized light beam into two partially overlapping light beams defining a single resulting light beam when the degree of polarization of the light beam is between 0° and 90°;

the intensity of the two partially overlapping light beams varying in accordance with the degree of polarization;

a medium;

a scanning means located in the path of the resulting light beam from said beam splitter and being so constructed and arranged to scan the resulting light beam onto said medium in order to scan one scan line;

means for controlling said polarizing means to change the degree of the polarization in order to change the intensity of the two partially overlapping light beams to shift the resulting light beam and thereby to shift the scan line.

5. The raster output scanner recited in claim 4, wherein the overlap between the two partially overlapping light beams is in the range of 0.3–0.7 of the width of the Gaussian distribution of the light beam from said laser light source at half of its maximum intensity.

6. The raster output scanner recited in claim 4, wherein the maximum range of movement occurs when the degree of polarization is changed by 90°.

* * * * *